(12) United States Patent
Wang et al.

(10) Patent No.: US 12,283,078 B2
(45) Date of Patent: Apr. 22, 2025

(54) SCANNING SYSTEM AND METHOD FOR CONTROLLING AIMING LIGHT SOURCE

(71) Applicant: WUXI IDATA TECHNOLOTY COMPANY LTD., Wuxi (CN)

(72) Inventors: Dongsheng Wang, Guangzhou (CN); Jiangtao Wei, Shenzhen (CN); Chen Chen, Shenzhen (CN); Ziqian Han, Suqian (CN)

(73) Assignee: WUXI IDATA TECHNOLOTY COMPANY LTD., Wuxi (CN)

( * ) Notice: Subject to any disclaimer, the term of this patent is extended or adjusted under 35 U.S.C. 154(b) by 470 days.

(21) Appl. No.: 17/945,262

(22) Filed: Sep. 15, 2022

(65) Prior Publication Data
US 2023/0005234 A1  Jan. 5, 2023

Related U.S. Application Data

(63) Continuation of application No. PCT/CN2020/102998, filed on Jul. 20, 2020.

(51) Int. Cl.
  *G06V 10/141* (2022.01)
  *G06T 9/00* (2006.01)
  *G06V 10/60* (2022.01)

(52) U.S. Cl.
  CPC .............. *G06V 10/141* (2022.01); *G06T 9/00* (2013.01); *G06V 10/60* (2022.01); *G06T 2207/10144* (2013.01); *G06T 2207/10152* (2013.01)

(58) Field of Classification Search
  CPC ...... G06V 10/141; G06V 10/60; G06V 10/17; G06T 9/00; G06T 2207/10144; G06T 2207/10152; H04N 23/56; H04N 25/531
  See application file for complete search history.

(56) References Cited

U.S. PATENT DOCUMENTS

2011/0225867 A1  9/2011  Moore et al.
2013/0161392 A1* 6/2013  Goren ................ G06K 7/10722
                                                           235/455

FOREIGN PATENT DOCUMENTS

| CN | 105472266 A | 4/2016 |
| CN | 106101545 A | 11/2016 |
| CN | 111970433 A | 11/2020 |
| CN | 111988541 A | 11/2020 |
| CN | 111988542 A | 11/2020 |
| WO | 2018136709 A1 | 7/2018 |

* cited by examiner

*Primary Examiner* — Sinh Tran
*Assistant Examiner* — Angel L Garces-Rivera
(74) *Attorney, Agent, or Firm* — JEEN IP LAW, LLC

(57) ABSTRACT

A scanning system and method for controlling an aiming light source (7), comprising: an image sensor (4), which sequentially exposes a pixel array through a rolling shutter to acquire an image of the target, the pixel array includes effective pixels (5) and non-imaging pixels (6), the effective pixels (5) are pixels that are actually used for image decoding, and the non-imaging pixels (6) are pixels that are not actually used for image decoding; an aiming light source (7) for projecting an aiming pattern (8) to aim at a target; a control unit (12) for controlling the image sensor (4) and the aiming light source (7), so that the aiming light source (7) is in turned off state during the exposure time of the effective pixel (5), and the aiming light source (7) is turned on during at least part of the exposure time of the non-imaging pixels (6).

17 Claims, 7 Drawing Sheets

Aim at a target by projecting a aiming pattern with the aiming light source — S1

Expose the pixel array of the image sensor sequentially, and the aiming light source is turned off when the pixel is an effective pixel, and is turned on according to a preset program when the pixel is a non-imaging pixel — S2

SCANNING SYSTEM AND METHOD FOR CONTROLLING AIMING LIGHT SOURCE

CROSS-REFERENCE TO RELATED APPLICATIONS

The present application is a 35 U.S.C. § 371 National Phase conversion of international (PCT) Patent Application No. PCT/CN2020/102998 filed Jul. 20, 2020, the contents of all of which are hereby incorporated by reference.

TECHNICAL FIELD

The present application relates to a scanning system and method for controlling an aiming light source.

BACKGROUND

Existing image readers are divided into two exposure modes: global exposure and rolling shutter exposure. Global exposure usually refers to the simultaneous exposure of all pixels, while rolling shutter exposure refers to sequential exposure of pixel arrays. The global exposure method avoids the jelly effect and produces clear images even for high-speed moving objects. Rolling shutter exposure cannot produce clear images for moving objects due to the time difference of pixel exposure, which will cause a jelly effect. Usually CCD (Charge Coupled Device) and some CMOS (Complementary Metal Oxide Semiconductor) are global exposure, and some CMOS are rolling shutter exposure. Compared with the CCD and CMOS of global exposure, the CMOS of rolling shutter exposure has a price advantage, its noise is less, and the image is clearer, so it is widely used.

In the field of optical image reading, it is usually necessary to use a aiming light source to project an aiming pattern to indicate the reading range of the image reader. However, since the brightness of the aiming pattern is higher than that of the surrounding environment, the image is often partially overexposed, which affects the reading efficiency. The global exposure image reader, because the exposure of all pixels is synchronized, can use blanking technology to stagger the opening time of the aiming light source and the exposure time of all pixels, so that the aiming pattern will not appear in the captured image and avoid partial overexposure; rolling shutter exposure due to the sequential exposure of pixels, the exposure time of the pixels is not synchronized, and the same blanking technology as the global exposure cannot be used.

In view of the above problems, the present application provides a new scanning system and method for controlling the aiming light source, and adopts new methods and technical means to solve these problems.

SUMMARY

In view of the problems faced by the background art, the purpose of the present application is to provide a scanning system and method for controlling the aiming light source to avoid the overexposure of the image caused by the aiming pattern projected by the aiming light source.

To achieve the above object, the present application adopts the following technical means:

A scanning system for controlling an aiming light source, comprising:
an image sensor, which sequentially exposes the pixel array through a rolling shutter to acquire an image of a target, the pixel array includes effective pixels and non-imaging pixels, the effective pixels are pixels that are actually used for image decoding, and the non-imaging pixels are pixels that are not actually used for image decoding;
an aiming light source for projecting an aiming, pattern to aim at the target;
a control unit for controlling the image sensor and the aiming light source, so that the aiming light source is turned off during an exposure time of the effective pixel, and the aiming light source is turned on during at least part of the exposure time of the non-imaging pixels.

Optionally, the image sensor sequentially performs exposure with pixel rows as a unit, and the pixel row in which the effective pixel exists is defined as an effective pixel row, and the aiming light source is turned off during the exposure time of the effective pixel row.

Optionally, the pixel row whose entire row is the non-imaging pixel is defined as a non-imaging pixel row, and the aiming light source is turned on during at least part of the exposure time of the non-imaging pixel row.

Optionally, the exposure time of the non-imaging pixel row partially coincides with the exposure time of the effective pixel row, and the aiming light source is turned on during the exposure time during which the non-imaging pixel rows are individually exposed, and is an turned off when the two exposure times coincide.

Optionally, the effective pixels are pixels that actually participate in light-sensing, and the non-imaging pixels are pixels that do not actually participate in light-sensing.

Optionally, the image formed by the effective pixels is used to extract characters for decoding, and image formed by the non-imaging pixels is removed during image preprocessing.

Optionally, the aiming pattern comprises an aiming frame for framing the target, and the image formed by the aiming frame on the pixel array roughly frames all the effective pixels.

Optionally, comprising an illumination source for providing illumination light, the control unit controls the illumination source to be turned on during the exposure time of the effective pixels of the image sensor and to be turned off during the exposure time of the non-image pixels.

The present application provides a method for controlling an aiming light source, comprising the following steps:
S1. Aim at a target by projecting a aiming pattern with the aiming light source;
S2. Expose the pixel array of the image sensor sequentially, and the aiming light source is turned off when the pixel is an effective pixel, and is turned on according to a preset program when the pixel is a non-imaging pixel.

Optionally, the preset program comprises turning on the aiming light source only during a separate exposure time of the non-imaging pixels, and turning off the aiming light source when the exposure time of the non-imaging pixel and the effective pixel coincides.

The application provides a scanning system for controlling an aiming light source, comprising:
a camera, comprising a lens and an image sensor, the lens is configured to acquire an image of a target, and the image sensor sequentially exposes the pixel array through a rolling shutter to convert the image into an electrical signal;
an aiming light source for projecting an aiming pattern to aim at the target, the aiming pattern comprising a light spot located in the camera's field of view, the light spot maintains a relatively fixed position relative to the camera's field of view within the depth-of-field range of the camera, so that the image formed by the aiming pattern on the pixel array via the lens maintains a relatively fixed position;

a control unit, for controlling the camera and the aiming light source, so that the aiming light source is turned on during the exposure time of the pixel corresponding to the image of the light spot on the pixel array.

Optionally, the pixel array is sequentially exposed with a pixel row as a unit, and the aiming light source is turned off during the exposure time of the pixel row corresponding to the image of the light spot.

Optionally, the pixel array is sequentially exposed in a pixel row as a unit, and the aiming light source is turned on during the exposure time of the pixel row which is staggered from the image of the aiming pattern.

Optionally, the aiming light source periodically projects the aiming pattern.

Optionally, the control unit controls the automatic exposure of the camera to adjust the exposure time of the next frame according to the quality of the previous frame, and adjust the turn-on time of the aiming light source according to the exposure time of the next frame of image.

Optionally, the aiming pattern comprises an aiming frame, which is configured to frame the target, and the aiming frame marks the range of the camera's field of view.

The present application provides a method for controlling an aiming light source, comprising the following steps:

S10. Aiming a target by projecting an aiming pattern from the aiming light source, the aiming pattern including a light spot in the field of view of the camera;

S20. Sequentially exposing the pixel array of the image sensor;

S30. Turning off the aiming light source during the exposure time of the pixel corresponding to the image of the aiming pattern on the pixel array.

Optionally, the pixel array is sequentially exposed with a pixel row as a unit, and the aiming light source is turned off within the exposure time of the pixel row corresponding to the image of the light spot.

Optionally, the pixel array is sequentially exposed by pixel row as a unit, and the aiming light source is turned on within the exposure time of the pixel row on the pixel array that is staggered from the image of the light spot.

Optionally, the aiming light source periodically projects the aiming pattern.

The application provides a scanning system for controlling an aiming light source, comprising:

a camera, for acquiring an image of a target;

an aiming light source, for projecting an aiming pattern to aim at the target;

a control unit, for controlling the camera and the aiming light source, so that in a plurality of frames of images continuously acquired by the camera, the aiming light source is only turned on in some frames.

Optionally, the control unit only decodes the image acquired by the camera when the aiming light source is turned off.

Optionally, the camera only transmits the image acquired when the aiming light source is turned off to the control unit.

Optionally, the camera comprises an image sensor that sequentially exposes the pixel array through a rolling shutter to convert the image of the target into an electrical signal; controlling the aiming light source to be turned on only in some frames by the control unit is defined as a first mode; controlling the aiming light source to be turned off within the exposure time of the pixel row corresponding to the image of the aiming pattern in the pixel array by the control unit is defined as a second mode; the control unit activates the first mode when the exposure time of the pixel row is greater than a threshold, and activates the second mode when the exposure time of the pixel row is lower than the threshold.

Optionally, the control unit controls the automatic exposure of the camera to adjust the exposure time of the next frame according to the quality of the previous frame, and to selectively activate the first mode or the second mode according to the exposure time of the next frame of image.

The present application provides a method for controlling an aiming light source, comprising the following steps:

S100. Aim at a target by projecting a aiming pattern with the aiming light source;

S200. Acquire an image of the target by the camera, and in a plurality of frames of images continuously acquired by the camera, the aiming light source is only turned on in some frames.

Optionally, the control unit only decodes the image acquired by the camera when the aiming light source is turned off.

Optionally, the camera only transmits the image acquired when the aiming light source is turned off to the control unit.

Optionally, the camera comprises an image sensor that sequentially exposes the pixel array through a rolling shutter to convert the image of the target into an electrical signal; controlling the aiming light source to be turned on only in some frames by the control unit is defined as a first mode; controlling the aiming light source to be turned off within the exposure time of the pixel row corresponding to the image of the aiming pattern in the pixel array by the control unit is defined as a second mode; the control unit activates the first mode when the exposure time of the pixel row is greater than a threshold, and activates the second mode when the exposure time of the pixel row is lower than the threshold.

Optionally, the control unit controls the automatic exposure of the camera to adjust the exposure time of the next frame according to the quality of the previous frame, and to selectively activate the first mode or the second mode according to the exposure time of the next frame of image.

Compared with the prior art, the present application has the following beneficial effects:

The image sensor sequentially exposes the pixel array through the rolling shutter to capture the image of the target. The pixel array includes effective pixels and non-imaging pixels, the effective pixels are pixels that are actually used for image decoding, and the non-imaging pixels are pixels that are not actually used for image decoding. The control unit controls the image sensor and the aiming light source so that the aiming light source is turned off during the exposure time of the effective pixel, while the aiming light source is turned on during at least part of the exposure time of the non-imaging pixel. The turn-on time of the aiming light source is staggered from the exposure time of the effective pixels, so as to avoid partial overexposure of the images captured by the exposure of the effective pixels.

The image sensor sequentially exposes the pixel array through a rolling shutter to convert the image of the target into an electrical signal. The control unit controls the camera and the aiming light source so that the aiming light source is turned off during the exposure time of the pixel corresponding to the image of the light spot on the pixel array. Therefore, the light spot will not be captured by the image sensor, so as to avoid partial overexposure of the image due to the light spot.

The control unit controls the camera and the aiming light source, so that in a plurality of frames of images continuously captured by the camera, the aiming light source is only turned on in some frames. Therefore, the aiming pattern is projected by the aiming light source to play an aiming role, and at the same time the aiming light source is not turned on in other frames, the captured image will not be overexposed due to the aiming pattern.

REFERENCE SIGNS

1. Handheld terminal; 2. Scanning head; 3. Camera; 4. Image sensor; 5. Effective pixels; 50. Effective pixel row; 6. Non-imaging pixels; 60. Non-imaging pixel row; 7. Aiming light source; 8. Aiming pattern; 9. Light pot; 10. Aiming frame; 11. Image; 12. Control unit; 13. Illumination source; 14. Memory; 15 Imaging range.

DETAILED DESCRIPTION

In order to facilitate a better understanding of the purpose, structure, features and effects of the present application, the present application will now be further described with reference to the accompanying drawings and specific embodiments.

The scanning system for controlling the aiming light source 7 of the present application is mainly applied to the scanning system of the rolling shutter, so as to avoid or reduce the partial overexposure of the image caused by the aiming pattern 8 projected by the aiming light source 7. The scanning system can be used for various scanning engines, scanning guns, ring scanners, handheld terminals 1 (PDA), stationary scanners, image recognition robots, and the like. The following takes the handheld terminal 1 as an example to introduce the structure, function and control method of the scanning system of the present application in detail.

Figure 1:
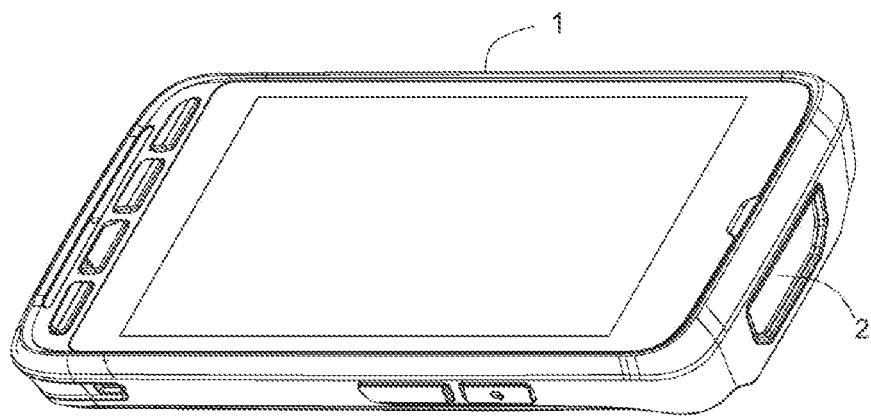
FIG. 1 is a schematic diagram of a handheld terminal of the present application.
Figure 2:
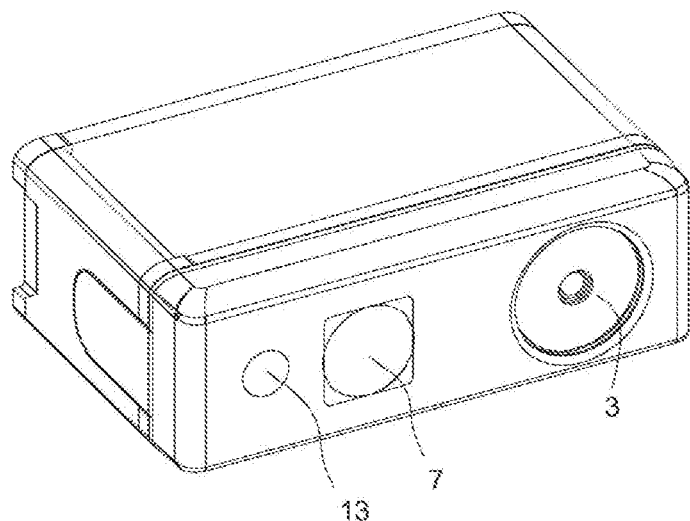
FIG. 2 is the enlarged schematic diagram of the scanning head in FIG. 1.
Figure 3:
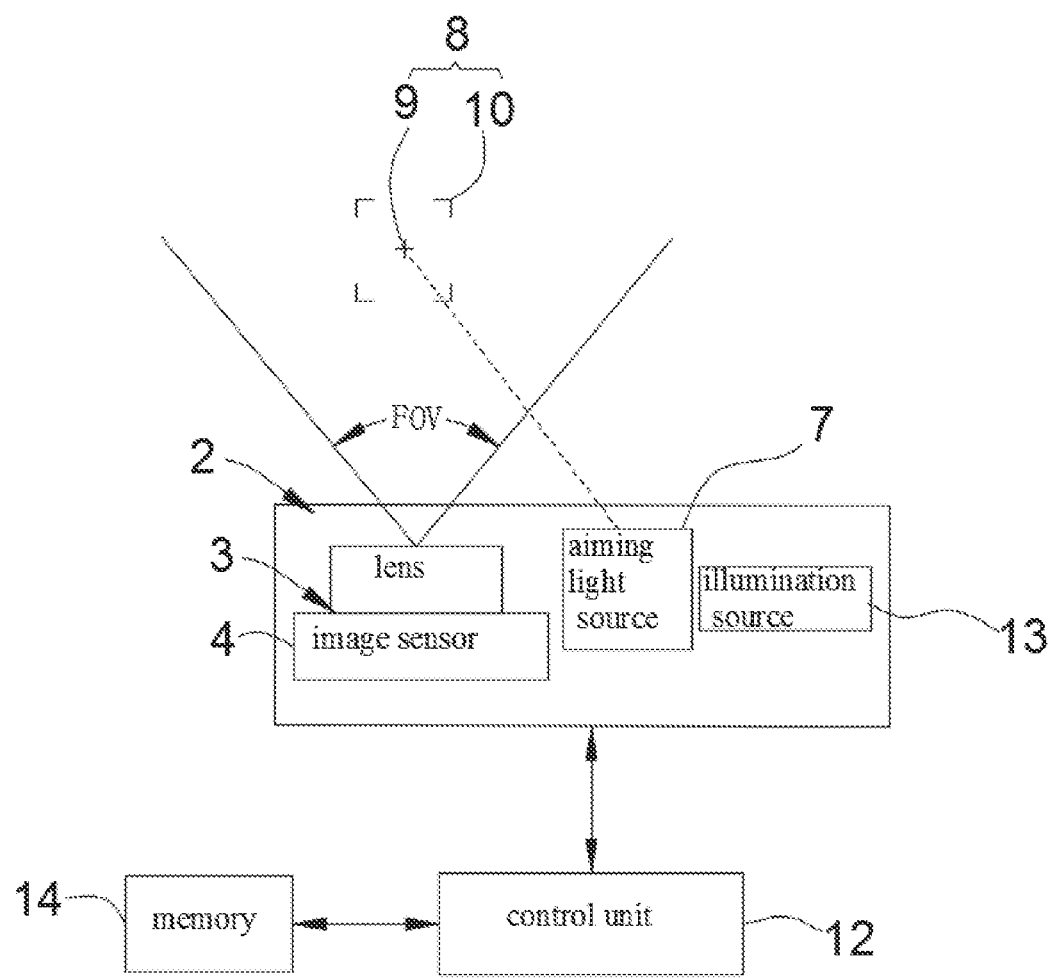
FIG. 3 is a block diagram of the scanning system of the present application.

As shown in FIG. 1, FIG. 2 and FIG. 3, the scanning system according to the embodiment of the present application is applied to the handheld terminal 1, and the handheld terminal 1 mainly includes a camera 3, an aiming light source 7 and a control unit 12.

The camera 3 includes a lens for capturing image(s) of the target and an image sensor 4 for photoelectric conversion of the image(s) of the target and the camera's field of view (FOV) has been known in advance. The image sensor 4 sequentially exposes the pixel array through the rolling shutter to capture the image(s) of the target in cooperation with the lens, and converts the image(s) of the target into electrical signals. Rolling shutter usually refers to sequential exposure in pixel row as a unit, but there are also sequential exposures in multi-pixel rows as units or exposure in pixel sub-areas, etc. The rolling shutter of the present application preferably uses a row-by-row exposure way. With supplementary reference to the image sensor 4 shown in FIG. 4, the pixel array (the figure is for illustration only and does not show the actual size and number of pixels) includes effective pixels 5 and non-imaging pixels 6. The effective pixels 5 are pixels actually used for image decoding, and the non-imaging pixels 6 are pixels that are not actually used for image decoding. The effective pixel 5 and the non-imaging pixel 6 will be further explained later with reference to the two embodiments in FIG. 4 and FIG. 5.

The aiming light source 7 is used to project the aiming pattern 8 to guide the user to aim at the target. The aiming light source 7 can usually use a laser with a diffractive optical element (DOE) or an LED with a lens to generate the aiming pattern 8, so that the aiming pattern 8 has a clear shape or outline, and the brightness of the aiming pattern 8 is also significantly higher than the ambient brightness. The aiming pattern 8 includes a light spot 9 in the center (usually a cross shape, but also a straight line or a circle, etc.) and an aiming frame 10 at the edge. Some of the aiming patterns 8 do not have the aiming frame 10 and only have the light spot 9. Within the depth of field of the camera, the light spot 9 is set to be located in the center of the camera's field of view, so that the relative position to the camera's field of view is fixed. This is because, although the camera's field of view changes proportionally with the change of the distance, the size of the light spot 9 also changes with the change of the distance in approximately the same proportion. Therefore, the position occupied by the light spot 9 in the camera's field of view remains substantially unchanged. Therefore, the image 11 formed by the light spot 9 on the pixel array of the image sensor 4 via the lens keeps the relative position fixed. Usually, the image 11 of the light spot 9 falls on several pixel rows in the center of the pixel array, which can also be known in advance.

Figure 4:
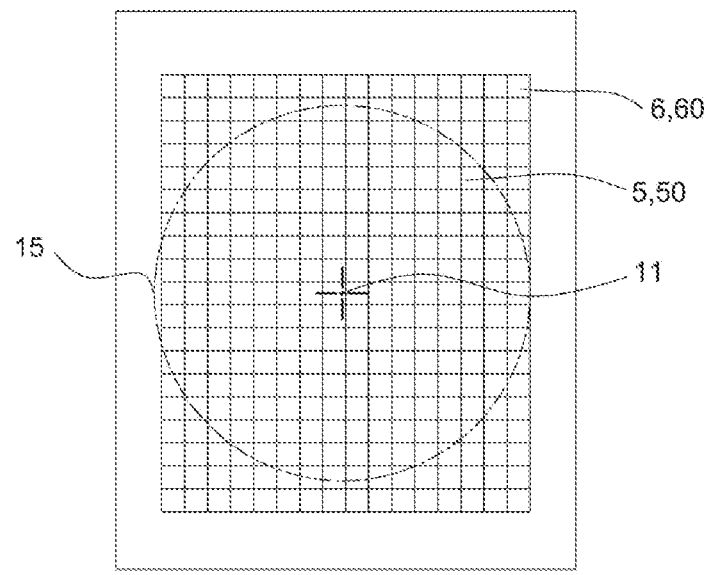
FIG. 4 is a schematic diagram of an image sensor of the present application.

Turning back to the image sensor 4 in the embodiment shown in FIG. 4, the imaging range 15 of the lens is shown by the circular dotted line, which covers a part of the pixel array, and these pixels actually used for photosensitive imaging are the effective pixel 5. Pixels outside the imaging range 15 of the lens are not actually used for light-sensing, so photoelectric conversion cannot be performed to generate images, and they are not used for image decoding. These pixels are the non-imaging pixels 6, and the non-imaging pixels 6 can be used to calculate the dark current generated in the pixels, so that the dark current in the effective pixels 5 can be removed by an algorithm. In this way, the magnitude of the current generated by the effective pixel 5 through photoelectric conversion is obtained, so as to achieve the effect of noise reduction. When the pixel array is sequentially exposed in pixel row as a unit, a pixel row whose entire row is the non-imaging pixel 6 is defined as a non-imaging pixel row 60, and the pixel row where the effective pixel 5 exists is defined as effective pixel row 50. Therefore, the non-imaging pixel row 60 is actually a pixel row that does not participate in light-sensing, and the effective pixel row 50 is a pixel row that at least some or all of the pixels actually participate in the light-sensing. The image 11 of the light spot 9 is located in the center of the forming range of the lens, and is also located in the center of the pixel array, and maintains a fixed relative position relative to the pixel array. The aiming frame 10 is slightly larger than the camera's field of view and will not be captured by the camera 3, so the image will not be overexposed.

Figure 5:
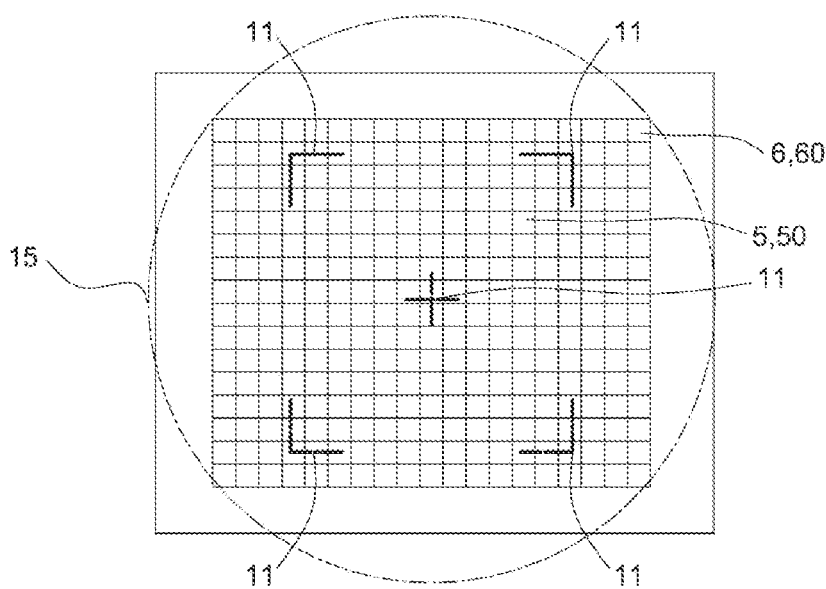
FIG. 5 is a schematic diagram of another image sensor of the present application.

In the image sensor 4 in another embodiment shown in FIG. 5, the imaging range 15 of the lens is shown by the circular dotted line, which basically covers the entire pixel array, so that the entire pixel array can receive light. The aiming pattern 8 projected by the aiming light source 7 also includes a light spot 9 (usually a cross shape, but also a line shape or a circle, etc.) and an aiming frame 10. The light spot 9 and the aiming frame 10 are both located in the field of view of the camera 3. Different from the previous embodiment, the aiming frame 10 is captured by the lens. The position of the image 11 of the aiming frame 10 on the pixel array can be known in advance. Pre-set the image 11 formed by the aiming frame 10 on the pixel array to roughly select all the effective pixels 5. Define other pixels on the pixel array as non-imaging pixels 6. The image 11 of the aiming frame 10 is actually located on the non-imaging pixel 6, so even if the aiming frame 10 is located in the camera's field of view, the image will not be overexposed. The image signals captured by the pixel array are first subjected to image preprocessing, and the image signals captured by the non-imaging pixels 6 are cut off without image decoding; the image signals captured by the effective pixels 5 will be used for character extraction and for image decoding.

In some embodiments (not shown, the same below), the imaging range of the lens is not necessarily circular, and the imaging range 15 of some special-shaped lenses may also be oval or even square.

The control unit 12 is used to control the image sensor 4 and the aiming light source 7. Specifically, according to a preset program stored in the memory, the exposure process of the pixel array of the image sensor 4 is controlled, and the turned on and off states of the aiming light source 7 are controlled during the exposure process.

The control unit 12 controls the frame rate of the camera 3 according to the preset program stored in the memory, and controls the exposure time of the pixel row of the image sensor 4 through automatic exposure, so as to adjust the exposure time of the pixel row when the next frame of image is captured according to the quality of the previous frame of image.

The control unit 12 can control the timing of the aiming light source 7 and the image sensor 4 through various solutions. The purpose of various solutions is to eliminate or reduce the partial overexposure of the target pattern caused by the aiming pattern 8 (mainly the light spot 9).

Figure 6:
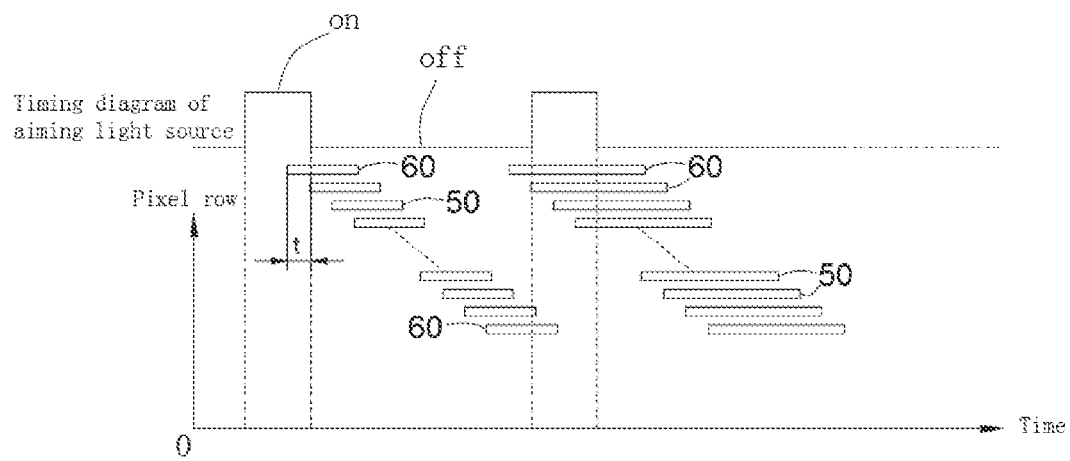
FIG. 6 is a timing diagram of the control unit controlling the image sensor and the aiming light source in an embodiment of the application.

Solution 1: Referring to FIG. 4 and FIG. 5, since the image 11 of the light spot 9 is located on the effective pixel row 50, when the on time of the aiming light source 7 is synchronized with the exposure time of the effective pixel row 50, it will cause partial overexposure of the image. Referring to the timing diagram of FIG. 6, firstly, the aiming light source 7 is turned on to aim at the target, and then the image of the target is captured by the camera 3. The image sensor 4 of the camera 3 sequentially exposes the pixel array through a rolling shutter. First exposed are several of the non-imaging pixel rows 60 located at the edges of the pixel array. The individual exposure time of the non-imaging pixel row 60 will continue for a preset time t, after which the effective pixel row 50 will begin to be exposed. After the non-imaging pixel row 60 is continuously exposed for a preset time t, the aiming light source 7 is turned off, and then the effective pixel row 50 is sequentially exposed. At this time, the effective pixel row 50 and the non-imaging pixel row 60 are exposed at the same time, and the exposure time of the two coincides. Since the aiming light source 7 is turned off at this time, the image will not be overexposed. After all the effective pixel rows 50 in a frame are exposed, the aiming light source 7 is turned on to project the aiming pattern 8, and the remaining non-imaging pixel rows 60 are sequentially exposed. At this time, the image sensor 4 may have started the exposure acquisition of the next frame of image, and the next frame of image is still in the initial exposure time of the non-imaging pixel rows 60 without starting the exposure time of the effective pixel rows 50. Turning on the aiming light source 7 during this period will not cause the image to be overexposed. Usually, the control unit 12 controls the exposure time of the pixel row of the image sensor 4 through automatic exposure, so as to adjust the exposure time of the pixel row when the next frame of image is captured according to the quality of the previous frame of image. The frame rate of the image sensor 4 is preset, and the starting time interval of sequential exposure between pixel rows is also preset. After the control unit 12 sets the exposure time of the next frame of image, the turn-on time of the aiming light source 7 can be set according to the exposure time of the non-imaging pixel row 60 and the effective pixel row 50. In this way, the aiming light source 7 is always turned off during the exposure time of the effective pixel 5, and turned on during at least part of the exposure time of the non-imaging pixel 6.

Of course, the control unit 12 may not control the image sensor 4 through automatic exposure, but set a fixed exposure time, so that the exposure time of the pixel row remains a fixed length. The pixel array periodically sequentially exposes the non-imaging pixel row 60 and the effective pixel row 50. The aiming light source 7 is also set to periodically project the aiming pattern 8, the aiming light source 7 is turned on during the individual exposure time of the non-imaging pixel row 60, and the aiming light source 7 is turned off during the exposure time of the effective pixel row 50.

Figure 7:
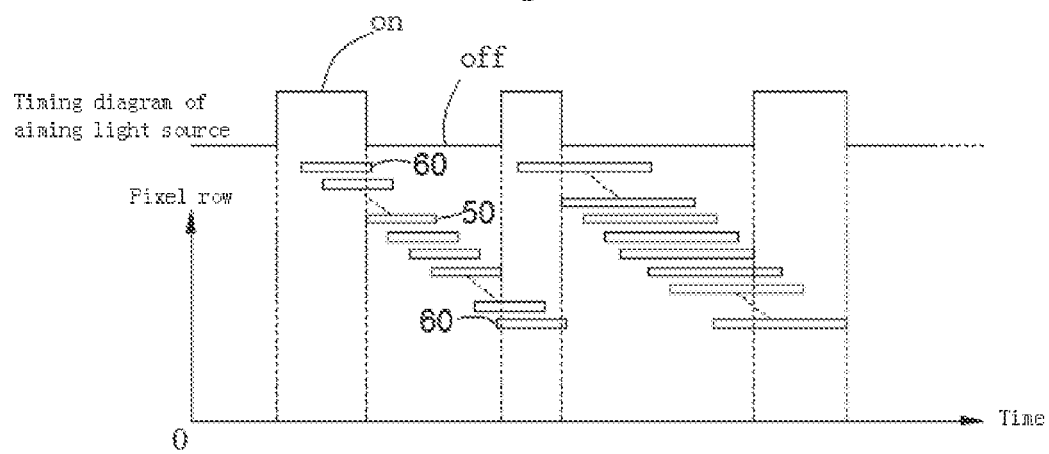
FIG. 7 is a timing diagram of the control unit controlling the image sensor and the aiming light source in another embodiment of the present application.

Solution 2: Referring to FIG. 4 and FIG. 5, since the image 11 of the light spot 9 is located on the effective pixel row 50, when the on time of the aiming light source 7 is synchronized with the exposure time of the effective pixel row 50, it will cause partial overexposure of the image. It is noted here that the position of the image 11 of the light spot 9 on the pixel array is basically fixed, as long as the exposure time of several pixel rows where the image 11 of the light spot 9 is located, the aiming light source 7 is turned off, the light spot 9 will not cause overexposure of the image, and several pixel rows corresponding to the image 11 of the light spot 9 can be known in advance. Referring to the timing diagram of FIG. 7, the aiming light source 7 is first turned on, and then the pixel array is sequentially exposed. When the pixel row corresponding to the image 11 of the light spot 9 starts to be exposed, the aiming light source 7 is turned off. When the exposure of the pixel row corresponding to the image 11 of the light spot 9 is completed, the aiming light source 7 is turned on again. Since the pixel row corresponding to the image 11 of the light spot 9 accounts for a small proportion of the total pixel array, the solution 2 achieves the control of the turned on and turned off time of the aiming light source 7 through precise control in space (the pixel row corresponding to the image 11 of the light spot 9 and other pixel rows). Compared with the Solution 1, in the Solution 2, the aiming light source 7 is turned on for a longer time, and the aiming pattern 8 can be clearer. Of course, the aiming light source 7 may also be turned off during the exposure time of the pixel row corresponding to the image 11 of the light spot 9, and the aiming light source 7 may be turned on during a certain period of other times but not all the time.

Figure 8:
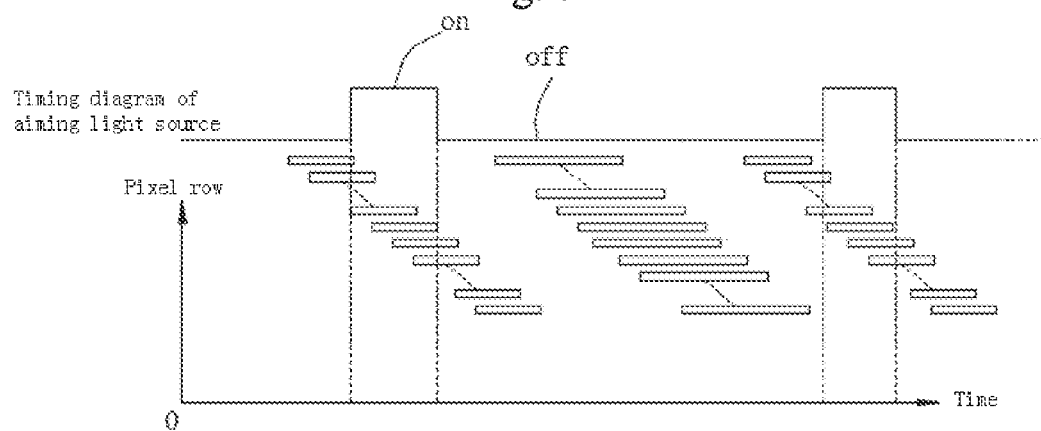
FIG. 8 is a timing diagram of the control unit controlling the image sensor and the aiming light source in another embodiment of the present application.

Solution 3: Referring to the timing diagram shown in FIG. 8, in a plurality of the frame images continuously captured by the camera 3, the aiming light source 7 is only turned on in some frames, so that the aiming pattern 8 will not be captured in other multi-frame images. The camera 3 only transmits the image captured when the aiming light source 7 is turned off to the control unit 12, and the control unit 12 only decodes the image captured by the camera 3 when the aiming light source 7 is turned off, which improves decoding efficiency. Of course, the camera 3 can also transmit all the captured images to the control unit 12, but the control unit 12 only decodes the images captured by the camera 3 when the aiming light source 7 is turned off. Solution 3 is not only applicable to rolling shutters, but also to global shutters. However, compared with Solutions 1 and 2, Solution 3 sacrifices decoding speed because only part of the image is decoded.

Figures 9, 10:
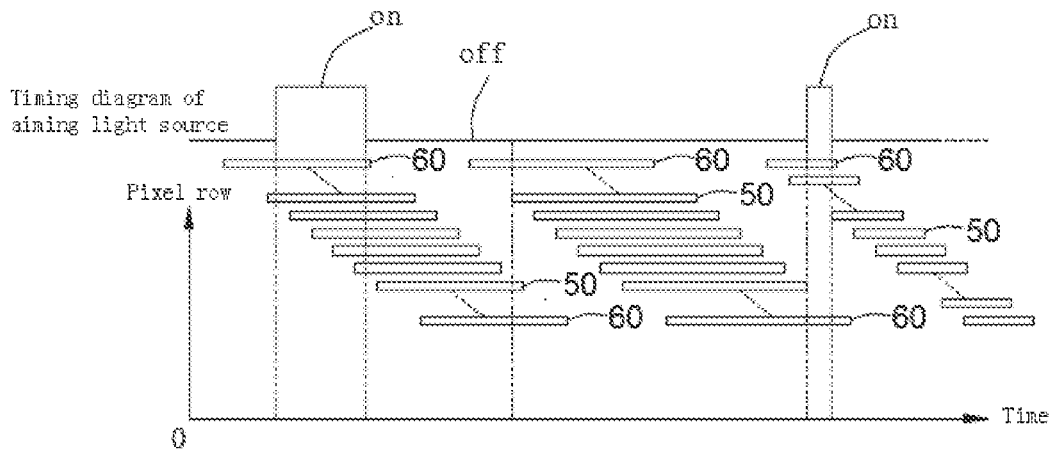
FIG. 9 is a timing diagram of the control unit controlling the image sensor and the aiming light source in another embodiment of the present application.
FIG. 10 is a flowchart of a method for controlling an aiming light source according to an embodiment of the present application.
Figure 11:
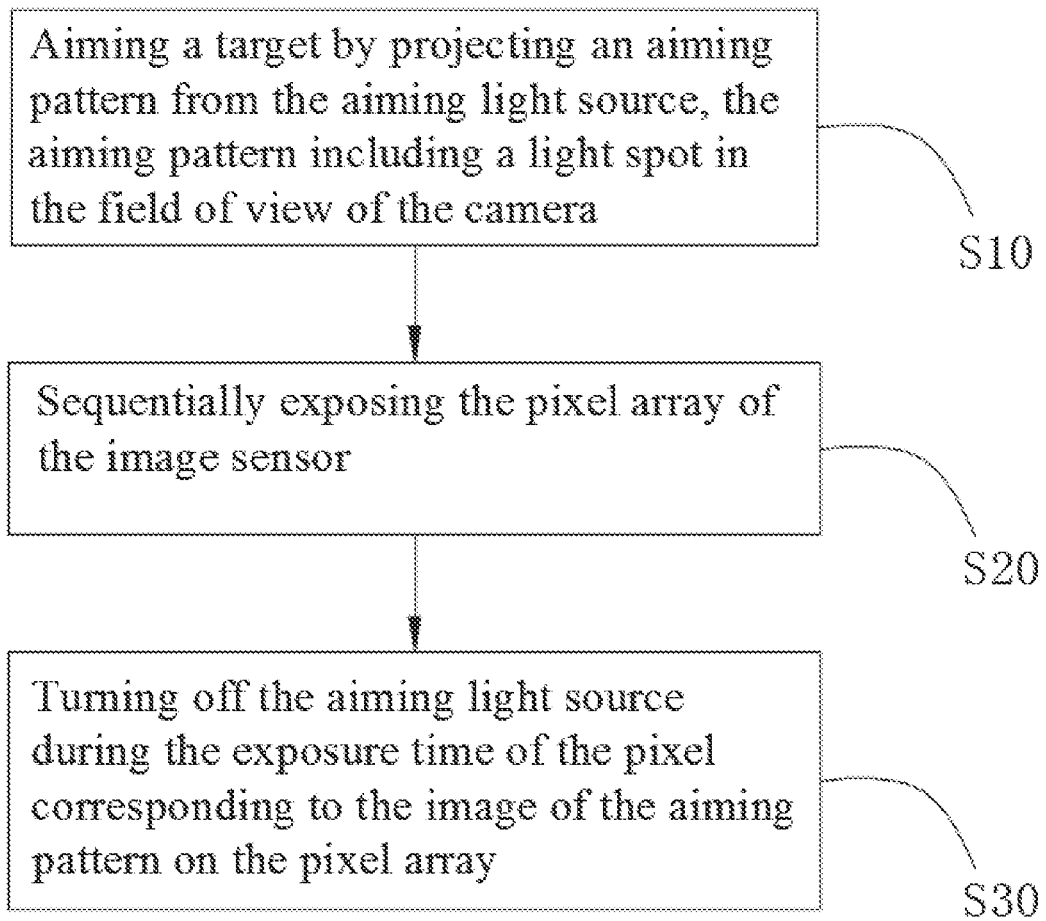
FIG. 11 is a flowchart of a method for controlling an aiming light source according to another embodiment of the present application.
Figure 12:
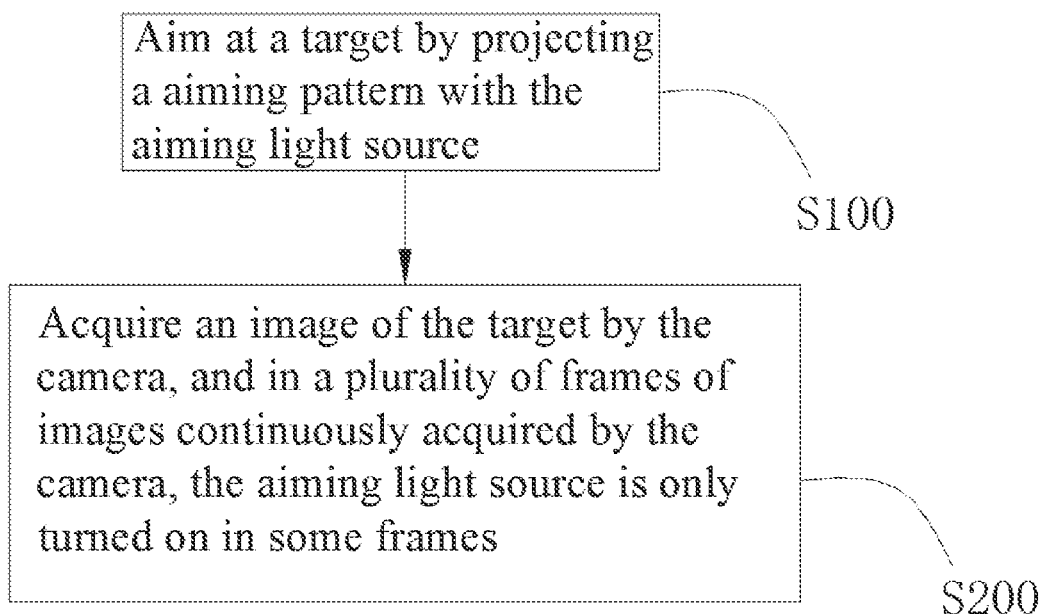
FIG. 12 is a flowchart of a method for controlling an aiming light source according to another embodiment of the present application.

Solution 4: Referring to the timing diagram shown in FIG. 9, when the control unit 12 adjusts the exposure time of the image pixel array through automatic exposure, so that the exposure time of the pixel row is very long, the exposure times of the effective pixel rows 50 of the first two frames of images as shown in FIG. 9 are connected together, and there is no separate exposure time of the non-imaging pixel rows 60 in the middle, which makes it impossible to use the solutions 1 and 2, and only the solution 3 can be used. However, the exposure time of the third frame image is relatively short, and the second frame image and the third frame image directly have a separate exposure time of the non-imaging pixel row 60, and the aiming light source 7 can be turned on to project the aiming pattern 8, so that the solution 1 or 2 could be used. Adopting solution 3 is defined as the first mode, adopting solution 1 or 2 is defined as the second mode. When the control unit 12 determines that the exposure time of the pixel row is greater than a threshold value, the control unit 12 activates the first mode, and when the exposure time of the pixel row is lower than the threshold value, the control unit 12 activates the second mode. The threshold can be pre-calculated or set to an appropriate value after multiple tests.

Usually, an illumination source 13 is also included to provide illumination light to illuminate the target. The control unit 12 controls the illumination source 13 to be turned on during the exposure time of the effective pixels 5 of the image sensor 4 and turned off during the individual exposure time of the non-imaging pixels 6, so as to reduce the power consumption of the illumination source 13.

In this embodiment, the camera 3, the aiming light source 7 and the illumination source 13 are integrated together to form a scanning head 2. The control unit 12 on the main board of the handheld terminal 1 controls the scanning head 2 to collect the image of the targets. In some embodiments (not shown, the same below), the camera 3, the aiming light source 7, the illumination source 13, the control unit 12 and other elements are integrated together to form the scan engine. The image of the target can be collected by the scanning engine through the integrated control switch, and the aforementioned ring scanner adopts a similar structure. In some embodiments, the decoding chip can be additionally set exclusively for decoding the image of the target, instead of being decoded by the control unit 12.

The scanning system and method for controlling the aiming light source of the present application have the following beneficial effects:

The image sensor 4 sequentially exposes the pixel array through the rolling shutter to capture the image of the target. The pixel array includes effective pixels 5 and non-imaging pixels 6, the effective pixels 5 are pixels that are actually used for image decoding, and the non-imaging pixels 6 are pixels that are not actually used for image decoding. The control unit 12 controls the image sensor 4 and the aiming light source 7 so that the aiming light source 7 is turned off during the exposure time of the effective pixel 5, while the aiming light source 7 is turned on during at least part of the exposure time of the non-imaging pixel 6. The turn-on time of the aiming light source 7 is staggered from the exposure time of the effective pixels 5, so as to avoid partial overexposure of the images captured by the exposure of the effective pixels.

The image sensor 4 sequentially exposes a pixel array through a rolling shutter to convert the image of the target into an electrical signal. The control unit 12 controls the camera 3 and the aiming light source 7 so that the aiming light source 7 is turned off during the exposure time of the pixel corresponding to the image 11 of the light spot 9 on the pixel array. Therefore, the light spot 9 will not be captured by the image sensor 4, so as to avoid partial overexposure of the image due to the light spot 9.

The control unit 12 controls the camera 3 and the aiming light source 7, so that in a plurality of frames of images continuously captured by the camera 3, the aiming light source 7 is only turned on in some frames. Therefore, the aiming pattern 8 is projected by the aiming light source 7 to play an aiming role, and at the same time the aiming light source 7 is not turned on in other frames, the captured image will not be overexposed due to the aiming pattern 8.

The above are only the preferred embodiments of the present application, and are not intended to limit the present application. Therefore, any modification, equivalent replacement, improvement, etc. made to the above embodiments according to the technical practice of the present application still fall within the scope of the technical solution of the present application.

What is claimed is:

1. A scanning system for controlling an aiming light source, comprising:
   an image sensor, which sequentially exposes a pixel array through a rolling shutter to acquire an image of a target, the pixel array includes effective pixels and non-imaging pixels, the effective pixels are pixels that are actually used for image decoding, and the non-imaging pixels are pixels that are not actually used for image decoding;
   an aiming light source for projecting an aiming pattern to aim at the target;
   a control unit for controlling the image sensor and the aiming light source, so that the aiming light source is turned off during an exposure time of the effective pixels, and the aiming light source is turned on during at least part of the exposure time of the non-imaging pixels;

wherein image formed by the effective pixels is used to extract characters for decoding, and image formed by the non-imaging pixels is removed during image pre-processing.

2. The scanning system according to claim 1, wherein the image sensor sequentially performs exposure with a pixel row as a unit, and the pixel row in which the effective pixels exist is defined as an effective pixel row, and the aiming light source is turned off during the exposure time of the effective pixel row.

3. The scanning system according to claim 2, wherein the pixel row whose entire row is the non-imaging pixels is defined as a non-imaging pixel row, and the aiming light source is turned on during at least part of the exposure time of the non-imaging pixel row.

4. The scanning system according to claim 3, wherein the exposure time of the non-imaging pixel row partially coincides with the exposure time of the effective pixel row, and the aiming light source is turned on during the exposure time during which the non-imaging pixel rows are individually exposed, and is turned off when the two exposure times coincide.

5. The scanning system according to claim 1, wherein the effective pixels are pixels that actually participate in light-sensing, and the non-imaging pixels are pixels that do not actually participate in light-sensing.

6. The scanning system according to claim 1, wherein the aiming pattern comprises an aiming frame for framing the target, and the image formed by the aiming frame on the pixel array roughly frames all the effective pixels.

7. The scanning system according to claim 1, comprising an illumination source for providing illumination light, the control unit controls the illumination source to be turned on during the exposure time of the effective pixels of the image sensor and to be turned off during the exposure time of the non-image pixels.

8. The scanning system according to claim 1, wherein the pixel array is sequentially exposed with a pixel row as a unit, and the aiming light source is turned off during the exposure time of the pixel row corresponding to the image of the light spot.

9. The scanning system according to claim 1, wherein the pixel array is sequentially exposed in a pixel row as a unit, and the aiming light source is turned on during the exposure time of the pixel row which is staggered from the image of the aiming pattern.

10. The scanning system according to claim 1, wherein the aiming light source periodically projects the aiming pattern.

11. The scanning system according to claim 1, wherein the control unit controls an automatic exposure of the camera to adjust an exposure time of a next frame according to the quality of a previous frame, and adjust a turn-on time of the aiming light source according to the exposure time of the next frame of image.

12. The scanning system according to claim 1, wherein the aiming pattern comprises an aiming frame, which is configured to frame the target, and the aiming frame marks the range of camera's field of view.

13. The scanning system according to claim 1, wherein the control unit only decodes the image acquired by the camera when the aiming light source is turned off.

14. The scanning system according to claim 1, wherein the camera only transmits the image acquired when the aiming light source is turned off to the control unit.

15. The scanning system according to claim 1, wherein the camera comprises an image sensor that sequentially exposes the pixel array through a rolling shutter to convert the image of the target into an electrical signal; controlling the aiming light source to be turned on only in some frames by the control unit is defined as a first mode; controlling the aiming light source to be turned off within the exposure time of the pixel row corresponding to the image of the aiming pattern in the pixel array by the control unit is defined as a second mode; the control unit activates the first mode when the exposure time of the pixel row is greater than a threshold, and activates the second mode when the exposure time of the pixel row is lower than the threshold.

16. The scanning system according to claim 5, wherein the control unit controls an automatic exposure of the camera to adjust an exposure time of a next frame according to the quality of a previous frame, and to selectively activate a first mode or a second mode according to the exposure time of the next frame of image.

17. The scanning system according to claim 1, further comprising an illumination source for providing illumination light, and the control unit controls the illumination source to be turned on during the exposure time of the effective pixels of the image sensor, and to be turned off during the exposure time of the non-imaging pixels.

* * * * *